United States Patent
Fu

(10) Patent No.: US 10,164,778 B2
(45) Date of Patent: Dec. 25, 2018

(54) METHOD AND SYSTEM FOR DISTRIBUTING ATTESTATION KEY AND CERTIFICATE IN TRUSTED COMPUTING

(71) Applicant: Alibaba Group Holding Limited, George Town, Grand Cayman (KY)

(72) Inventor: Yingfang Fu, Beijing (CN)

(73) Assignee: Alibaba Group Holding Limited, George Town (KY)

( * ) Notice: Subject to any disclaimer, the term of this patent is extended or adjusted under 35 U.S.C. 154(b) by 0 days.

(21) Appl. No.: 15/847,777

(22) Filed: Dec. 19, 2017

(65) Prior Publication Data

US 2018/0234255 A1    Aug. 16, 2018

(30) Foreign Application Priority Data

Dec. 15, 2016 (CN) .......................... 2016 1 1164535
Feb. 14, 2017 (CN) .......................... 2017 1 0078988

(51) Int. Cl.
*G06F 21/00* (2013.01)
*H04L 9/32* (2006.01)
(Continued)

(52) U.S. Cl.
CPC ............ *H04L 9/3263* (2013.01); *G06F 21/44* (2013.01); *G06F 21/60* (2013.01); *H04L 9/08* (2013.01);
(Continued)

(58) Field of Classification Search
CPC ........ G06F 21/44; G06F 21/57; G06F 21/572; G06F 21/60; G06F 21/602; G06F 21/604;
(Continued)

(56) References Cited

U.S. PATENT DOCUMENTS 9,323,901 B1    4/2016 Nair
2005/0144440 A1*  6/2005 Catherman ............. G06F 21/57
                                                                    713/156
(Continued)

FOREIGN PATENT DOCUMENTS

EP          0962070       12/1999
WO      2012098543        7/2012
(Continued)

*Primary Examiner* — Edward Zee
(74) *Attorney, Agent, or Firm* — Shun Yao; Park, Vaughan, Fleming & Dowler LLP

(57) ABSTRACT

One embodiment described herein provides a system and method for secure attestation. During operation, a Trusted Platform Module (TPM) of a trusted platform receives a request for an attestation key from an application module configured to run an application on the trusted platform. The request comprises a first nonce generated by the application module. The TPM computes an attestation public/private key pair based on the first nonce and a second nonce, which is generated by the TPM, computes TPM identity information based on a unique identifier of the TPM and attestation key, and transmits a public key of the attestation public/private key pair and the TPM identity information to the application module, thereby enabling the application module to verify the public key of the attestation public/private key pair based on the TPM identity information.

23 Claims, 8 Drawing Sheets

(51) Int. Cl.
  *H04L 9/30* (2006.01)
  *H04L 9/14* (2006.01)
  *G06F 21/60* (2013.01)
  *G06F 21/44* (2013.01)
  *H04L 9/08* (2006.01)

(52) U.S. Cl.
  CPC .............. *H04L 9/0819* (2013.01); *H04L 9/14* (2013.01); *H04L 9/30* (2013.01); *H04L 2209/127* (2013.01)

(58) Field of Classification Search
  CPC . G06F 21/70; G06F 21/71; H04L 9/08; H04L 9/0816; H04L 9/0819; H04L 9/0861; H04L 9/0866; H04L 9/0869; H04L 9/0877
  See application file for complete search history.

(56) References Cited

U.S. PATENT DOCUMENTS

| | | |
|---|---|---|
| 2005/0259825 A1 | 11/2005 | Trifonov |
| 2006/0026693 A1 | 2/2006 | Bade |
| 2007/0016794 A1 | 1/2007 | Harrison |
| 2007/0076889 A1 | 4/2007 | DeRobertis |
| 2007/0147292 A1 | 6/2007 | Van Ewijk |
| 2008/0114983 A1 | 5/2008 | Sherkin |
| 2008/0123859 A1 | 5/2008 | Mamidwar |
| 2008/0165973 A1 | 7/2008 | Miranda Gavillan |
| 2008/0219449 A1 | 9/2008 | Ball |
| 2009/0034733 A1 | 2/2009 | Raman |
| 2009/0092252 A1 | 4/2009 | Noll |
| 2009/0106551 A1 | 4/2009 | Boren |
| 2009/0204812 A1 | 8/2009 | Baker |
| 2009/0271634 A1 | 10/2009 | Boult |
| 2010/0211787 A1 | 8/2010 | Bukshpun |
| 2010/0265077 A1 | 10/2010 | Humble |
| 2011/0069972 A1 | 3/2011 | Wiseman |
| 2011/0099367 A1* | 4/2011 | Thom .................. H04L 9/0877 713/156 |
| 2011/0231615 A1 | 9/2011 | Ober |
| 2012/0177201 A1 | 7/2012 | Ayling |
| 2012/0250863 A1 | 10/2012 | Bukshpun |
| 2012/0265892 A1 | 10/2012 | Ma |
| 2013/0083926 A1 | 4/2013 | Hughes |
| 2013/0101119 A1 | 4/2013 | Nordholt |
| 2013/0227286 A1 | 8/2013 | Brisson |
| 2013/0251145 A1 | 9/2013 | Lowans |
| 2014/0259138 A1 | 9/2014 | Fu |
| 2014/0281500 A1 | 9/2014 | Ignatchenko |
| 2014/0281511 A1 | 9/2014 | Kaushik |
| 2014/0331050 A1 | 11/2014 | Armstrong |
| 2014/0351915 A1 | 11/2014 | Otranen |
| 2015/0046709 A1 | 2/2015 | Anspach |
| 2015/0181308 A1 | 6/2015 | Ducharme |
| 2015/0236852 A1 | 8/2015 | Tanizawa |
| 2015/0263855 A1 | 9/2015 | Schulz |
| 2015/0288542 A1 | 10/2015 | Ashrafi |
| 2015/0381363 A1 | 12/2015 | Teixeira |
| 2016/0021068 A1 | 1/2016 | Jueneman |
| 2016/0226846 A1 | 8/2016 | Fu |
| 2016/0241396 A1 | 8/2016 | Fu |
| 2016/0248581 A1 | 8/2016 | Fu |
| 2016/0294783 A1 | 10/2016 | Piqueras Jover |
| 2016/0337329 A1* | 11/2016 | Sood ....................... H04L 63/08 |

FOREIGN PATENT DOCUMENTS

| | | |
|---|---|---|
| WO | 2013026086 | 2/2013 |
| WO | 2016070141 | 5/2016 |

* cited by examiner

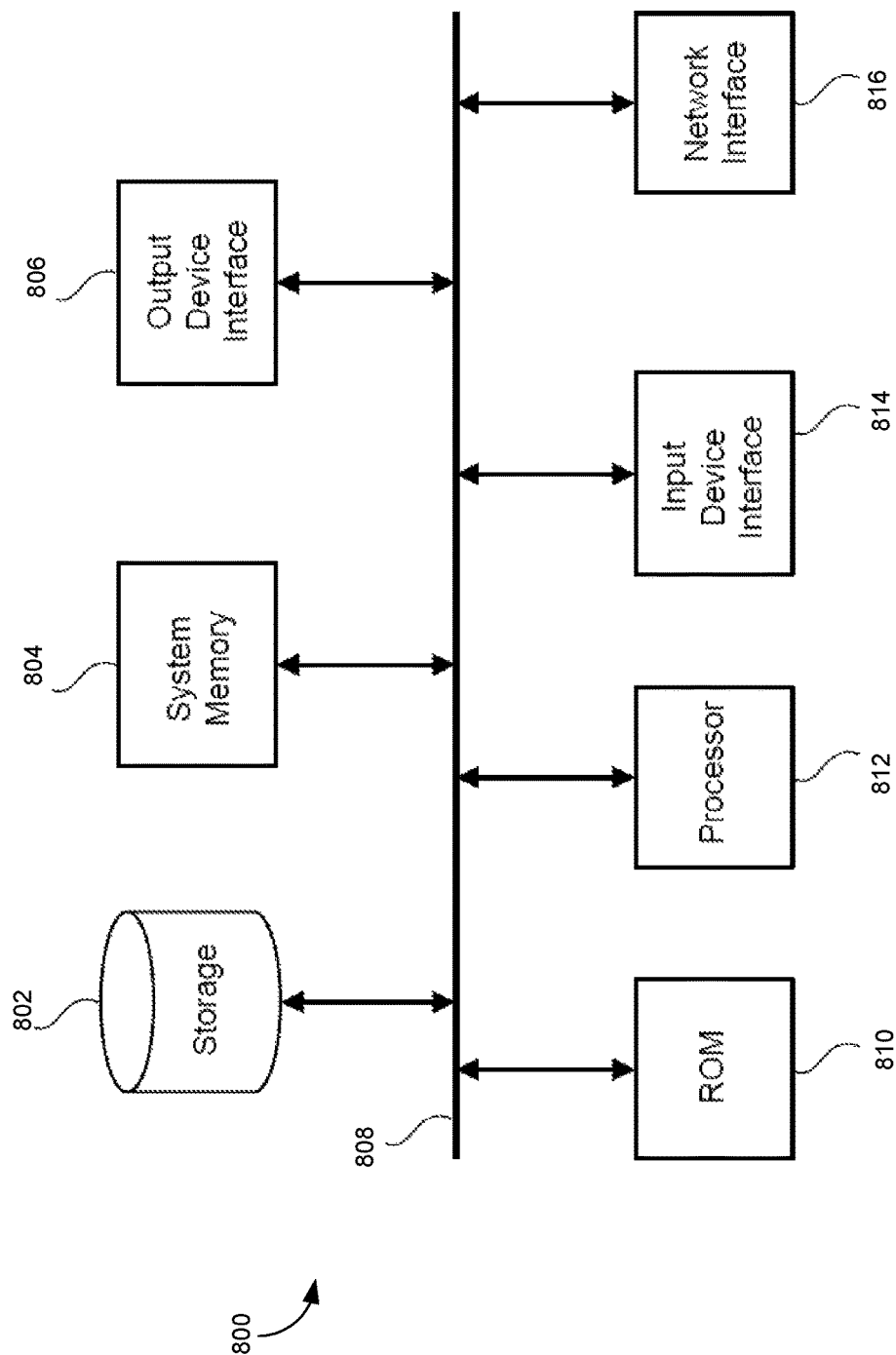

METHOD AND SYSTEM FOR DISTRIBUTING ATTESTATION KEY AND CERTIFICATE IN TRUSTED COMPUTING

RELATED APPLICATION

Under 35 U.S.C. § 119, this application claims priority to Chinese Patent Application No. 201710078988.7, filed on 14 Feb. 2017, and Chinese Patent Application No. 201611164535.8, filed on 15 Dec. 2016.

BACKGROUND

Field

This disclosure is generally related to communication security based on trusted computing. More specifically, this disclosure is related to a system and method for distributions of key and certificate between communication parties implementing trusted computing.

Related Art

With the exponential growth in data communication and telecommunication over the computer networks including the Internet, the technologies for data security to protect private information passed on the computer networks from eavesdropping and other attacks have also been constantly improving and evolving.

Traditionally, various password-based authentication protocols provide two entities (e.g., a client and a server) in secure communication the opportunity to authenticate their identities to each other. A typical password-based authentication protocol can include the use of a pre-set or static password and a dynamic code for authentication purposes. However, the static password and the dynamic code can be vulnerable to illegal interception, and distributing the dynamic code can sometimes be cumbersome and unsecure. Moreover, this security scheme does not take into consideration whether the platform itself (e.g., a user's client machine) is secure.

Among many different security measures, trusted computing can provide hardware-based solutions. Trusted computing is an emerging technology developed by the Trusted Computing Group (TCG) toward building trustworthy computer platforms. With trusted computing, the computer will consistently behave in expected ways, and those behaviors will be enforced by computer hardware and software. Enforcing this behavior is achieved by loading the hardware with a unique encryption key inaccessible to the rest of the system. According to the TCG, "[[a]] trusted component, operation, or process is one whose behavior is predictable under almost any operating condition and which is highly resistant to subversion by application software, viruses, and a given level of physical interference." Current trusted computing protocols mostly emphasize the generation of the trusted measurement report, which provides assurance of the integrity of the platform, and may fall short in ensuring the security of the platform identity keys (e.g., the attestation identity keys (AIKs)) and corresponding certificates.

SUMMARY

One embodiment described herein provides a system and method for secure attestation. During operation, a Trusted Platform Module (TPM) of a trusted platform receives a request for an attestation key from an application module configured to run an application on the trusted platform. The request comprises a first nonce generated by the application module. The TPM computes an attestation public/private key pair based on the first nonce and a second nonce, which is generated by the TPM, computes TPM identity information based on a unique identifier of the TPM and attestation key, and transmits a public key of the attestation public/private key pair and the TPM identity information to the application module, thereby enabling the application module to verify the public key of the attestation public/private key pair based on the TPM identity information.

In a variation on this embodiment, the request for the attestation key further comprises an application-identifier associated with the application, and the application-identifier and the first nonce are protected using an asymmetric encryption technique and a public key of an endorsement public/private key pair issued to the TPM by its manufacturer.

In a further variation, the TPM decrypts, using a private key of the endorsement public/private key pair, the received request to obtain the application-identifier and the first nonce in plain text.

In a further variation, in response to obtaining the first nonce in plain text, the TPM encrypts, using the first nonce and a symmetric encryption technique, an endorsement certificate issued to the TPM by its manufacturer. The endorsement certificate comprises the unique identifier of the TPM. The TPM then transmits the encrypted endorsement certificate to the application module.

In a further variation, the application module decrypts, using the first nonce, the encrypted endorsement certificate, extracts the unique identifier of the TPM included in the endorsement certificate, and compares the unique identifier of the TPM extracted from the endorsement certificate and the unique identifier included in the TPM identity information in order to verify the public key of the attestation public/private key pair. In response to a successful verification of the public key of the attestation public/private key pair, the application module keeps the public key of the attestation public/private key pair.

In a variation on this embodiment, the application module transmits a certificate request to a certificate authority (CA). The certificate request comprises the public key of the attestation public/private key pair and the TPM identity information.

In a further variation, the certificate request further comprises an endorsement certificate issued to the TPM by its manufacturer, and the endorsement certificate comprises the unique identifier of the TPM.

In a further variation, the CA verifies the certificate request based on the unique identifier of the TPM included in the endorsement certificate and the unique identifier of the TPM included in the TPM identity information.

In a variation on this embodiment, computing the attestation public/private key pair comprises encrypting, using a public key of an endorsement public/private key pair issued to the TPM by its manufacturer, a concatenation of the first nonce, the second nonce, and an application-identifier associated with the application.

In a variation on this embodiment, computing the TPM identity information comprises encrypting, using a private key of the attestation public/private key pair, a collection of information that comprises at least the public key of the attestation public/private key pair and the unique identifier of the TPM.

One embodiment described herein provides a system and method for obtaining an attestation key. During operation, an application module running an application on a trusted platform transmits a request for the attestation key to a Trusted Platform Module (TPM) associated with the trusted platform. The request comprises a first nonce. The application module receives from the TPM a public key of the attestation public/private key pair, TPM identity information, and an endorsement certificate encrypted using the first nonce. The TPM identify information and the endorsement certificate each comprises a unique identifier of the TPM. The application module decrypts, using the first nonce, the encrypted endorsement certificate, extracts the unique identifier of the TPM included in the endorsement certificate, and compares the unique identifier of the TPM extracted from the endorsement certificate and the unique identifier included in the TPM identity information in order to verify the public key of the attestation public/private key pair. In response to a successful verification of the public key of the attestation public/private key pair, the application module keeps the public key of the attestation public/private key pair.

BRIEF DESCRIPTION OF THE FIGURES

FIG. 8 conceptually illustrates an electronic system with which some implementations of the subject technology are implemented.

In the figures, like reference numerals refer to the same figure elements.

DETAILED DESCRIPTION

Figure 1:
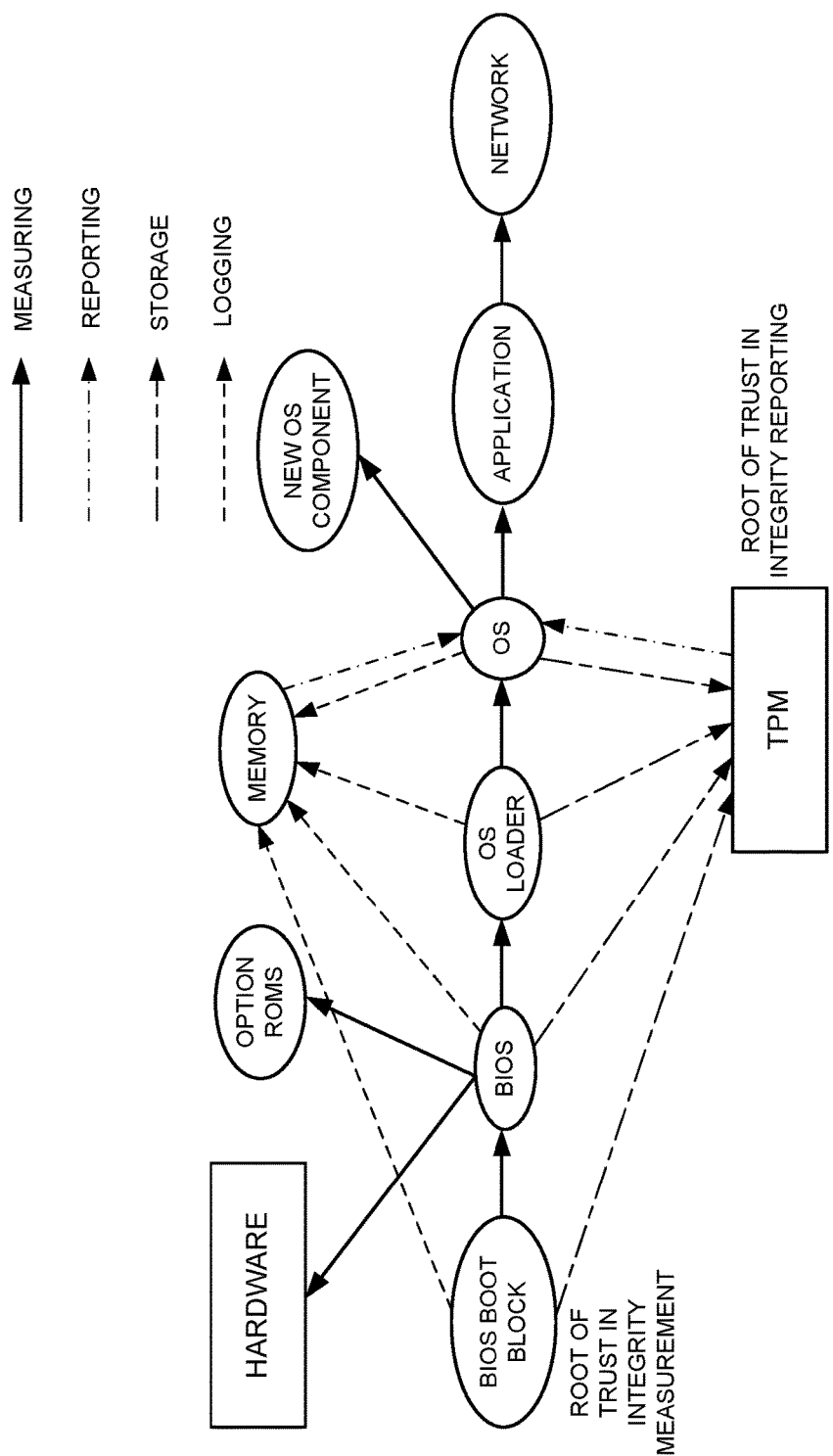
FIG. 1 illustrates the chain of trust in a PC as defined by the Trusted Computing Group.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

In this disclosure, a method and system is provided for improving data and communication security. More specifically, embodiments of the present invention can ensure the secure distribution of platform identity keys (e.g., an attestation identity key (AIK)) to user processes running on a trusted platform. The Trusted Platform Module (TPM) can generate and protect the AIK issued to the user process. Because, during the issuance of the AIK, mutual authentication based on the unique endorsement key (EK) and the unique identifier of the TPM can be performed between the TPM and the user process, only legitimate user processes can obtain the AIK and endorsement certificate. The endorsement certificate can also include the unique identifier of the TPM. Moreover, when the user process requests, from a Privacy Certificate Authority (PCA), an AIK certificate, it can include both the endorsement certificate and the AIK. The PCA can validate the identity of the requester based on the unique identifier of the TPM included in the endorsement certificate and issue a certificate based on the AIK (e.g., the AIK certificate) to the user process. As a result, the PCA only issues AIK certificates to processes that can prove that their AIKs are provided by legitimate TPMs. The AIK certificate can then be used by the user process for remote attestation. For example, by sending the AIK certificate to a remote party, the user process can prove its trustworthiness to the remote party.

In this disclosure, an entity is also referred to as a trusted entity (e.g., a trusted server or a trusted client) if the entity is equipped with modules (e.g., hardware or software modules) that can enable trusted computing. Without specifying, it is assumed that all entities are trusted-computing enabled.

In this disclosure, expression $[Y]_X$ can be used to indicate encrypting a message Y using an encryption key X. Moreover, a certificate issued to an entity U by a Certificate Authority (CA) can be expressed as: Cert=$[U, PK(U), CA]_{SK(CA)}$, where PK(U) is the public key of entity U and SK(CA) is the private key of the CA.

Trusted Computing

The core of trusted computing is the root of trust and the chain of trust. In trusted computing, the root of trust can be factory-installed hardware or firmware, such as the Trusted Platform Module (TPM). A TPM can be implemented as dedicated, cost-effective crypto-chips. A TPM can be physically connected to the computation platform and coupled to the CPU (central processing unit) via external buses. For example, the TPM on a personal computer (PC) can be mounted onto the main board of the PC and connected via a Low Pin Count (LPC) bus. In addition to storing the information for authenticating the platform, a TPM can also be used to store platform measurements that help ensure that the platform remains trustworthy. Authentication (ensuring that the platform can prove that it is what it claims to be) and attestation (a process helping to prove that a platform is trustworthy and has not been breached) are necessary steps to ensure safer computing in all environments.

The chain of trust is the iterative means to extend the boundary from the root of trust. The trustworthiness of a currently running component is based on the trustworthiness of a previously running component. Starting from the root of trust (also known as the trust anchor), if each time the computational environment of the platform changes (e.g., the running of certain codes), the trust can be maintained, thus establishing a reliable chain of trust, the platform can be viewed as trustworthy by local and remote entities.

Trusted computing technologies can include trusted measurement, trusted reporting, trusted storage, and trusted networking. FIG. 1 illustrates the chain of trust in a PC as defined by the Trusted Computing Group. More specifically, FIG. 1 shows the chain of trust for measurement, reporting, storage, and logging.

In addition to TPMs, Trusted Platform Control Modules (TPCMs) have also been developed. TPM was a subordinate device and the root of trusted measurement was put into BIOS (as shown in FIG. 1), which faces the threat of being tampered with. TPCM incorporates into the module the root of trusted measurement, thus protecting the root and original point of measurement and modifying the boot and measurement sequence. Accordingly, a chain of trust can be established using the TPCM chip as the trust anchor, thus allowing the TPCM chip to control the boot, I/O, and provisioning of the system.

During the operation of the computing platform, the TPCM needs to ensure the integrity of the next level executable code before the system transfers control to the next level executable code. The control of the system continues to be transferred to subsequent levels of executable code, thus establishing the chain of trust. More specifically, the TPCM or the TPM can start the boot process from a trusted condition and extend this trust until the operating system has fully booted and applications are running.

Remote attestation, which allows a client computer to authenticate its hardware and software configuration to a remote server, is an important component of trusted computing. The goal of the remote attestation is to enable a remote system (challenger) to determine the level of trust in the integrity of platform of another system (attestator). However, currently available remote attestation mechanisms (e.g., attestation protocols) can be vulnerable to man-in-the-middle (MITM) attacks.

Figure 2:
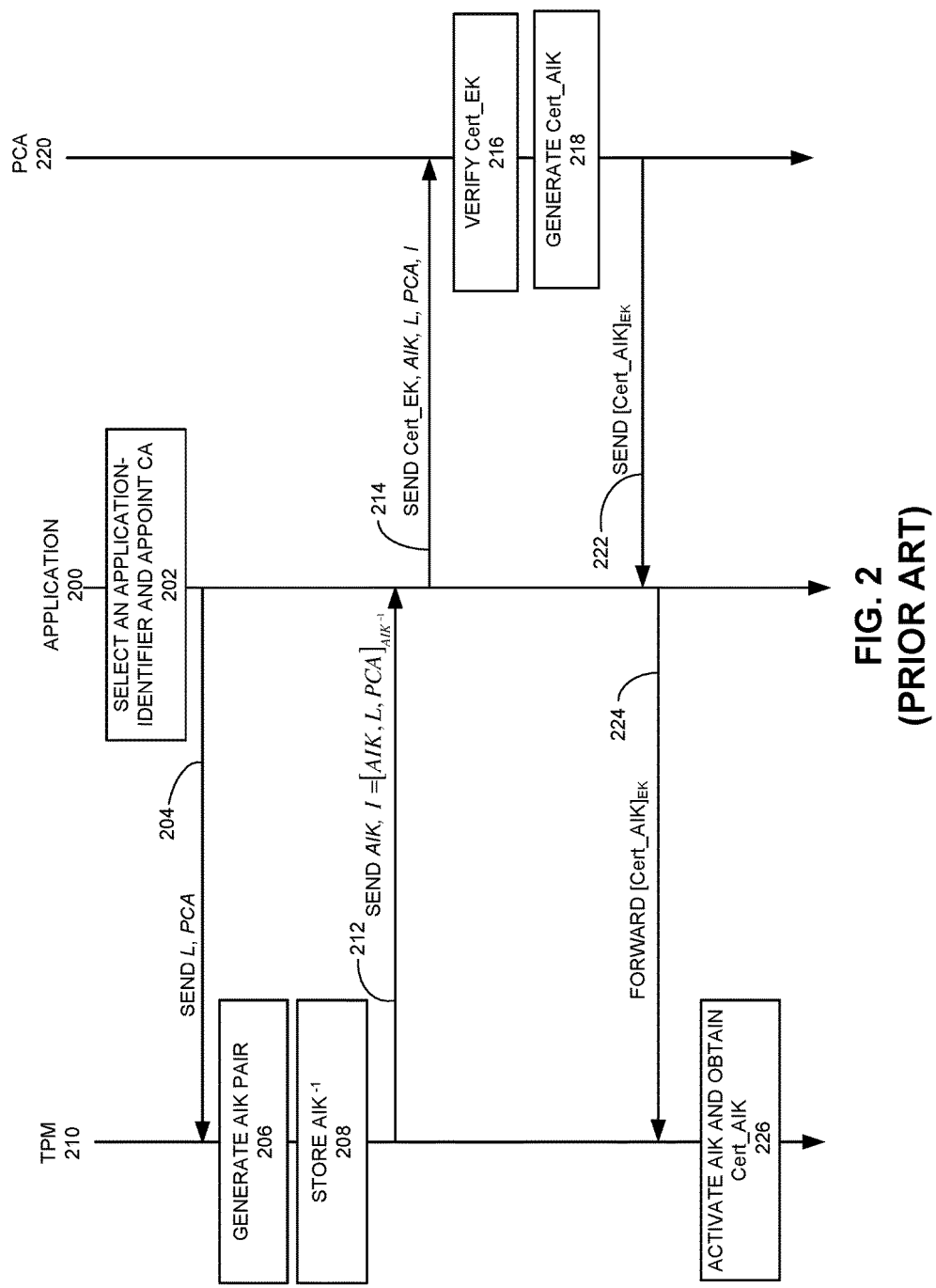
FIG. 2 illustrates an exemplary certificate process, according to prior art.

FIG. 2 illustrates an exemplary certificate process, according to prior art. During operation, an application or a user process 200 running on a trusted-computing-enabled system can select an application-identifier L and appoint a third-party certificate authority 220 (operation 202). Note that the application-identifier can be user-defined and can be subsequently used for looking up a certificate issued to the application. Such an application-identifier cannot be used as a unique identifier for the application or the TPM of the system. Applicant 200 can then send L and the identifier of the third-party CA (noted as PCA) to the trusted computing module (e.g., TPM 210) of the system (operation 204). Because L is sent unprotected, it can be intercepted by a malicious party. In response to receiving L and PCA, TPM 210 can generate a public/private key pair, known as the attestation identity key (AIK) pair (operation 206). For example, TPM 210 can execute the TPM_MakeIdentity command to generate the AIK pair. TPM 210 can store the private key of the AIK pair (noted as $AIK^{-1}$) (operation 208), and send the public key of the AIK pair (noted as AIK) and an encrypted message I to the application (operation 212). The encrypted message I can include the AIK, the application-identifier, and the PCA, all encrypted using $AIK^{-1}$. For example, I can be expressed as: $I=[AIK, L, PCA]_{AIK^{-1}}$, where L is the application-identifier, and PCA is the identifier of the third-party CA. This also means that TPM 210 sends a message I digitally signed using the AIK private key to application 200. The signing of message I binds information included in I to TPM 210, which now owns the AIK pair. However, TPM 210 cannot prove to application 200 that the AIK pair is indeed generated by TPM 210.

Upon receiving the AIK and I, application 200 can send a certificate request to PCA 220 (operation 214). The certificate request can include the manufacturer certificate or EK certificate (noted as Cert_EK), the AIK, the application-identifier, PCA, and I. Note that the manufacturer or EK certificate is a unique certificate issued by the manufacturer of the TPM. The manufacturer or EK certificate can be expressed as: $Cert\_EK=[T, EK, MF]_{SK(MF)}$, where T is the TPM identifier, EK is the unique endorsement key issued to the TPM by the TPM manufacturer, MF is manufacturer identifier, and SK(MF) is the private key of the manufacturer. This expression indicates that the information including T, EK, and MF is encrypted using the private key of the manufacturer. The EK certificate has been previously distributed to application 200 by TPM 210. In this operation, the EK certificate and L are not protected, and can be intercepted by a malicious party, which can then use the intercepted EK certificate to obtain an AIK certificate from the CA.

In response to receiving the EK certificate and AIK, PCA 220 can verify the received EK certificate (i.e., Cert_EK) (operation 216), generate an AIK certificate based on the received AIK public key and the private key of PCA 220 (e.g., PCA 220 can use its own private key to digitally sign the AIK public key to generate the AIK certificate) (operation 218), and return the EK-protected AIK certificate to application 200 (operation 222). The AIK certificate can be expressed as: $Cert\_AIK=[L, AIK, PCA]_{SK(PCA)}$, and the EK-protected AIK certificate can be expressed as $[Cert\_AIK]_{EK}$.

Upon receiving the AIK certificate, application 200 can forward the EK-protected AIK certificate to TPM 210 (operation 224). TPM 210 can activate the AIK and obtain the AIK certificate by decrypting, using the private key of EK (i.e., $EK^{-1}$) (operation 226). The AIK and the AIK certificate can later be used by application 200 to authenticate itself to a remote party.

From FIG. 2, one can see that, when the user process or application is requesting the AIK from the TPM (operations 202-212), it does not authenticate itself to the TPM. Similarly, when the TPM returns the public key of the AIK pair to the user process (operation 214-222), it does authenticate itself to the user process either. This makes the AIK-issuance process vulnerable to MITM attacks. The same deficiency exists in the issuance of the AIK certificate. More specifically, while requesting the AIK certificate from the PCA, the user process does not authenticate itself to the PCA. In other words, the PCA cannot verify that the certificate request is from user processing running on a trusted platform. A process running on a non-trusted platform can use an EK certificate of a trusted platform to illegally obtain the AIK certificate from the PCA.

Secure Certificate Process

To overcome the deficiency of the conventional certificate process, in some embodiments, the system can protect information exchanged between the user process and the TPM using the endorsement key and can enable the PCA to authenticate a user process requesting a certificate. To do so, the public key of the endorsement key pair (denoted as EK) can be distributed among the user process or application, the hardware or software module enforcing trusted computing (e.g., the TPM), and the third-party certificate authority (e.g., the PCA).

Figure 3:
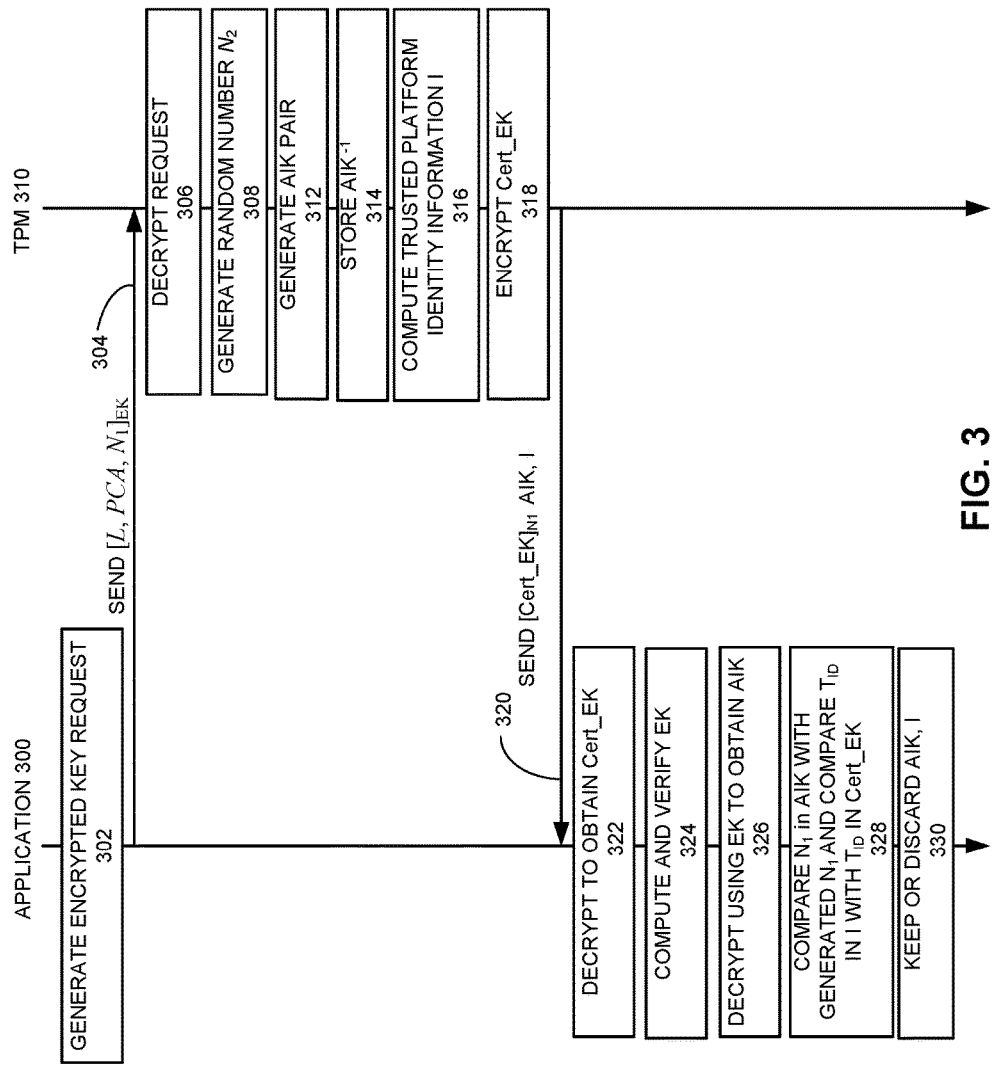
FIG. 3 illustrates an exemplary secure process for obtaining an attestation identity key, according to one embodiment.

FIG. 3 illustrates an exemplary secure process for obtaining an attestation identity key, according to one embodiment. During operation, a user process or application 300 running on a trusted platform can generate an encrypted key request (operation 302). More specifically, the encrypted key request can be generated by encrypting, using the public key of the endorsement key pair (denoted EK), a collection of information that includes at least the application-identifier, the PCA identifier, and a random number (e.g., a nonce) generated by the application. In some embodiments, the encrypted key request can be expressed as: $[L, PCA, N_1]_{EK}$, where L denotes the application-identifier, PCA denotes the PCA identifier, and $N_1$ denotes the nonce generated by the user process or application. Application 300 can then send the encrypted key request to the trusted computing module (e.g., the TPM) 310 of the trusted platform (operation 304). Note that the trusted platform can be any trusted-computing-enabled device, including, but not limited to: a personal computer (PC), a laptop computer, a tablet computer, a smartphone, a server computer, etc.

Upon receiving the encrypted key request, TPM 310 can decrypt, using the private key of the endorsement key pair (denoted $EK^{-1}$), the encrypted key request to obtain the collection of information that includes L, PCA, and $N_1$ (operation 306). Note that $EK^{-1}$ is maintained by and never leaves TPM 310. TPM 310 can generate a second nonce (denoted as $N_2$) (operation 308), and generate a public/private key pair based on the application-identifier, the two random numbers, and the private key of the endorsement key pair (operation 312). This public/private key pair can later be used for attestation purposes and can be referred to as the attestation identity key pair (denoted as $AIK/AIK^{-1}$). In some embodiments, the public key of the AIK pair can be expressed as: $AIK=[N_1\|N_2\|L]_{EK^{-1}}$. In other words, the AIK can be obtained by digitally signing, using the private key of EK, the concatenation of $N_1$, $N_2$, and L. $AIK^{-1}$ can be the corresponding private key of the AIK pair, and TPM 310 can store $AIK^{-1}$ (operation 314).

TPM 310 can then compute, based on the AIK pair and a unique identifier of the trusted platform, the trusted platform identity information (denoted I) (operation 316). The unique identifier of the trusted platform can be an identifier issued to the TPM by the TPM manufacturer, and can be denoted as $T_{ID}$. In some embodiments, the trusted platform identity information I can be expressed as: $I=[AIK, L, T_{ID}, PCA]_{AIK^{-1}}$, where AIK is the public key of the AIK pair generated by TPM 310, L is the application-identifier, $T_{ID}$ is the unique identifier of TPM 310, and PCA is the identifier of the PCA.

TPM 310 can also encrypt, using a symmetric encryption technique and $N_1$, the EK certificate (operation 318), and send the encrypted EK certificate, the AIK, and I to application 300 (operation 320). Upon receiving the information sent by TPM 310, application 300 can decrypt, using $N_1$, to obtain the EK certificate sent by TPM 310 (operation 322), and compute and verify the EK included in the EK certificate (operation 324). As disclosed previously, the public key of the endorsement key EK has been distributed to and maintained by application 300. Therefore, by comparing the received EK with the maintained EK, application 300 can verify the authenticity of the EK certificate. Moreover, the encryption and decryption using $N_1$ can also authenticate TPM 310 to application 300, because $N_1$ is only known to application 300 and has been sent by application 300 to TPM 310 previously. In addition, application 300 can decrypt, using EK, to obtain the AIK public key, which includes $N_1$ (operation 326). Application 300 can compare $N_1$ included in the AIK with its own $N_1$, and compare the $T_{ID}$ included in the received I with the $T_{ID}$ included in the received EK certificate (operation 328). If they match, application 300 can determine that the AIK and I are indeed sent by a legitimate TPM and keep them; otherwise, application 300 can terminate the process and discard the received AIK platform identity information (operation 330). Note that, if application 300 keeps the AIK, it can later be used for attestation purposes.

In the process shown in FIG. 3, user application 300 protects information (e.g., the key request) sent to TPM 310 using EK and includes in such information a first random number $N_1$. TPM 310 can generate an AIK pair based on the first and second random numbers (i.e., $N_1$ and $N_2$) and compute platform identity information, which can include both the AIK and a unique identifier of TPM 310. TPM 310 can then send the AIK and AIK-encrypted platform identity information along with the EK certificate encrypted using $N_1$. Compared to conventional approaches, this allows mutual authentication between user application 300 and TPM 310 via $N_1$, EK, and the EK certificate. Moreover, the platform identity information includes both the unique identifier of the TPM and the identifier of the user application, thus binding the user application to the particular TPM.

Figure 4:
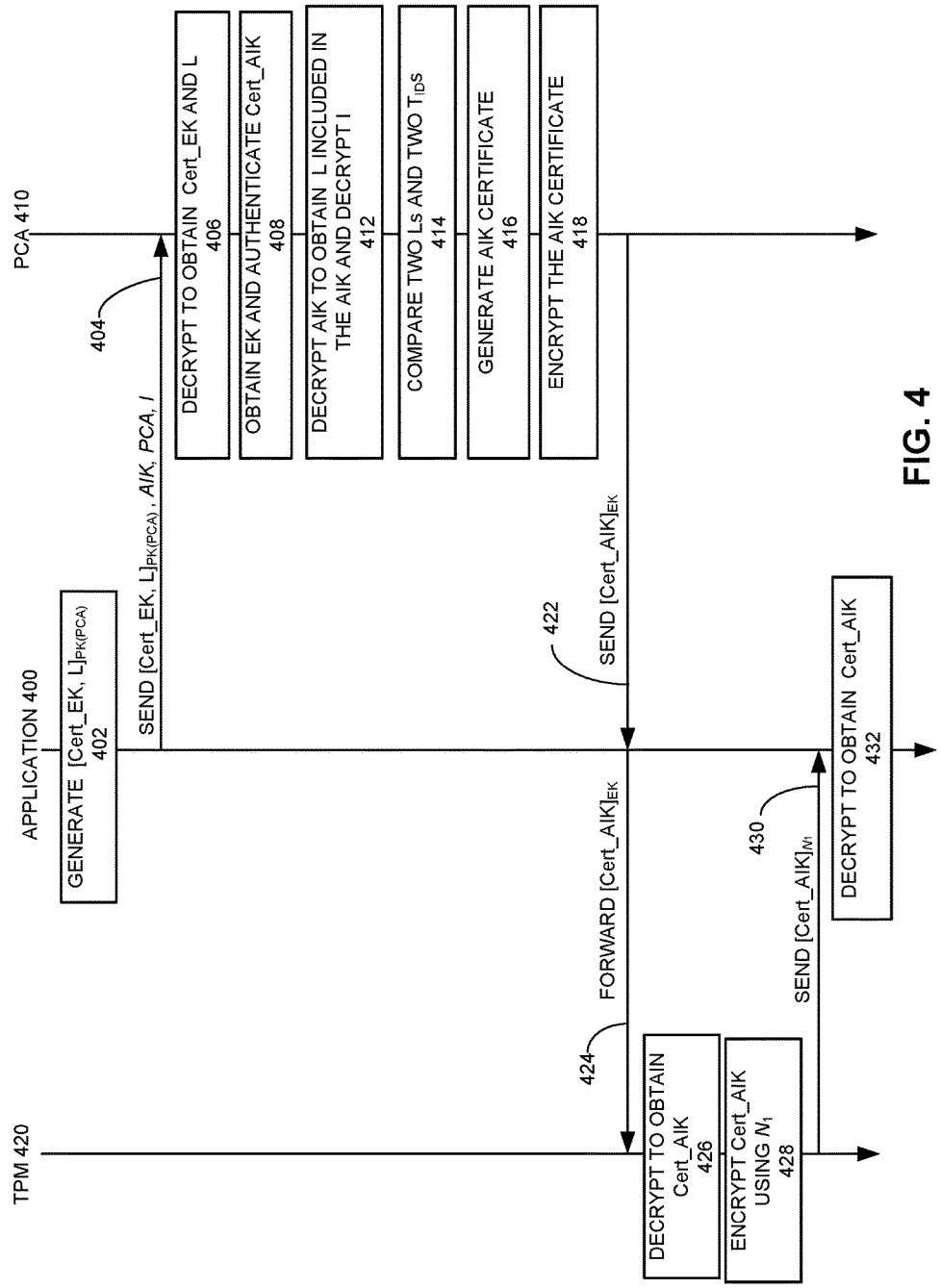
FIG. 4 illustrates an exemplary secure process for obtaining an AIK certificate, according to one embodiment.

Once a user application obtains a valid AIK from a TPM, it can request, from a third-party CA (e.g., a PCA) a certificate bound to such an AIK. This certificate (which can be called the AIK certificate) can then be used by the user application for remote attestation. FIG. 4 illustrates an exemplary secure process for obtaining an AIK certificate, according to one embodiment. During operation, user application 400 can encrypt the EK-certificate (Cert_EK) along with its application-identifier (L) using the public key of the selected PCA, denoted as $[Cert\_EK, L]_{PK(PCA)}$ (operation 402) and sends a certificate request that includes such an encrypted message to PCA 410 (operation 404). In some embodiments, the certificate request can include [Cert_EK, $L]_{PK(PCA)}$, AIK, PCA, and I, where AIK is the public key of the AIK pair, PCA is the identifier of the third-party CA, and I is the aforementioned platform identity information.

Upon receiving the certificate request, PCA 410 can decrypt, using its private key, $[Cert\_EK, L]_{PK(PCA)}$ to obtain the EK certificate and the application-identifier L (operation 406). PCA 410 can also obtain EK and verify the authenticity of the received EK certificate using the public key of the TPM manufacturer (operation 408). Subsequently, PCA 410 can use EK to decrypt AIK to obtain L and use AIK to decrypt the platform identity information I (operation 412). PCA 410 then compares this newly obtained L with the previously obtained L and the $T_{ID}$ included in I with the $T_{ID}$ included in Cert_EK in order to authenticate the AIK (operation 414).

In other words, PCA 410 can compare L sent by user application 400 with L embedded in Cert_EK in order to verify that the EK certificate was sent by an application running on the trusted platform that produces the EK certificate. Moreover, by comparing these two Ls and by comparing the $T_{ID}$ included in I with the $T_{ID}$ included in Cert_EK, PCA 410 can verify that the AIK pair is indeed produced by a legitimate TPM for the particular application with an application-identifier L. If the EK certificate and/or the AIK cannot be authenticated, PCA 410 can discard or ignore the certificate request. On the other hand, in response to authenticating Cert_EK and AIK, PCA 410 can generate a certificate corresponding to the AIK for application 400, referred to as the AIK certificate (operation 416), encrypt the AIK certificate using the previously obtained public key of the endorsement key (i.e., EK) (operation 418), and send the EK-encrypted AIK certificate (denoted as $[Cert\_AIK]_{EK}$) to application 400 (operation 422). In some embodiments, PCA 410 can generate the AIK certificate based on the application-identifier, the AIK, the unique identifier of the TPM associated with application 400, the PCA-identifier, and the PCA's private key. For example, PCA 410 can sign, using the PCA's private key, a message that includes the application-identifier, the AIK, the unique identifier of the TPM associated with application 400, and the PCA-identifier. The AIK certificate can be expressed as: $Cert\_AIK=[L, AIK, T_{ID}, PCA]_{SK(PCA)}$.

Note that, because application 400 does not have access to the private key of the endorsement key (i.e., $EK^{-1}$, which never leaves the corresponding TPM), application 400 cannot directly obtain the AIK certificate. In some embodiments, application 400 can forward the received EK-encrypted AIK certificate to its associated TPM, TPM 420 (operation 424). Upon receiving the EK-encrypted AIK certificate, TPM 420 can decrypt, using $EK^{-1}$, the EK-protected AIK certificate to obtain the AIK certificate (operation 426). TPM 420 can then encrypt, using a symmetrical encryption technique and previously obtained $N_1$, the AIK certificate (operation 428), and send the encrypted AIK certificate to application 400 (operation 430). Upon receiving the encrypted AIK certificate, application 400 can then perform a decryption operation using its previously generated $N_1$ to obtain the AIK certificate (operation 432). The obtained AIK certificate can later be used by application 400 for remote attestation. In other words, the AIK certificate allows application 400 to authenticate itself as being a legitimate application running on a trusted platform to a remote entity.

Compared to the conventional certificate process, this new process allows the PCA to verify whether the AIK is indeed generated by a legitimate TPM for the requesting application, thus preventing a malicious process from obtaining a certificate from the PCA using a stolen EK certificate and AIK. As a result, this new process ensures that the PCA only issues AIK certificates to applications or processes that can provide verifiable evidence (e.g., the AIK and the TPM identity information) linking them to legitimate TPMs, thus enhancing the issuance security of the AIK certificates.

Once an application obtains the AIK and the PCA-issued AIK certificate, it can allow a remote party to challenge its trustworthiness or is able to prove to a remote party its trustworthiness using the AIK certificate. For example, when an application wishes to authenticate itself to a remote party, it can send its AIK certificate to the remote party. By verifying the AIK certificate, the remote party can verify the trustworthiness of the application. In some embodiments, the application can also send application-identifier L, the AIK certificate (Cert_AIK), and the EK certificate (Cert_EK) to the remote party. The remote party can verify the certificate chain, thus verifying the trustworthiness of the application. For example, Cert_EK is signed using the private key of the manufacturer, and the remote party can then verify Cert_EK using the manufacturer's public key. Similarly, the AIK certificate is signed using the private key of the PCA, and the remote party can verify whether Cert_AIK is issued by the PCA using the public key of the PCA. Subsequent to successful attestation, the remote party can trust the application and can start secure communication (e.g., sending and receiving messages) with the application.

Secure System

Figure 5:
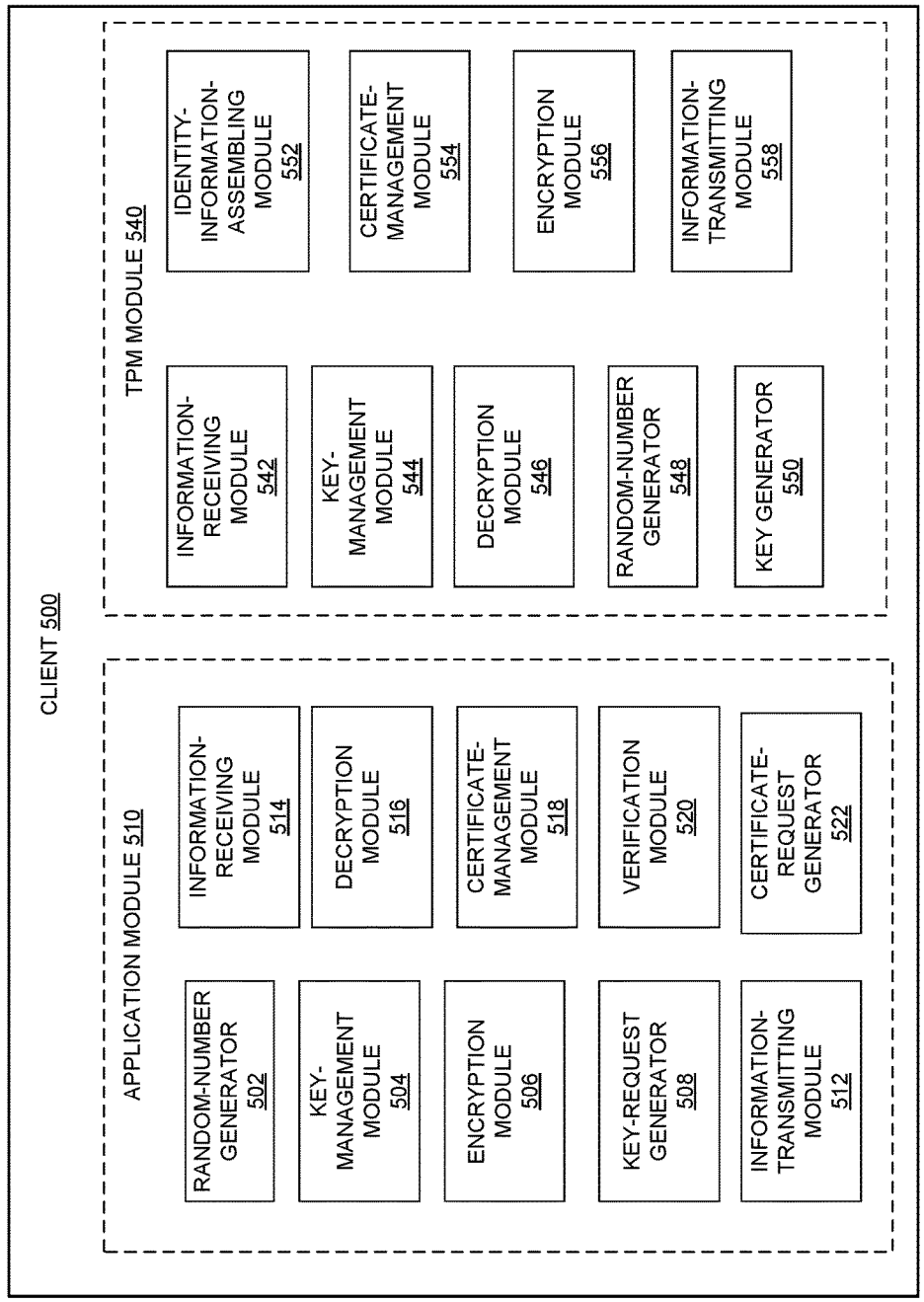
FIG. 5 illustrates a block diagram of an exemplary trusted-computing-enabled client, according to one embodiment.

FIG. 5 illustrates a block diagram of an exemplary trusted-computing-enabled client, according to one embodiment. Client 500 can include an application module 510 and a TPM (or TPCM) module 540. Application module 510 can enable a user-controlled application or process, and TPM module 540 can include hardware or firmware that enforces the trusted computing rules.

Application module 510 can include a random-number generator 502, a key-management module 504, an encryption module 506, a key-request generator 508, an information-transmitting module 512, an information-receiving module 514, a decryption module 516, a certificate-management module 518, a verification module 520, and a certificate-request generator 522.

TPM (or TPCM) module 540 can include an information-receiving module 542, a key-management module 544, a decryption module 546, a random-number generator 548, a key generator 550, an identity-information-assembling module 552, a certificate-management module 554, an encryption module 556, and an information-transmitting module 558.

In order for application module 510 to enable remote attestation, application module 510 needs to obtain an attestation identity key (AIK) pair from TPM module 540 and a certificate corresponding to the AIK pair from a PCA, and the various modules included in application module 510 work in concert to achieve such a goal. More specifically, random-number generator 502 can be responsible for generating a random number $N_1$, which can later become part of the AIK and be used for authentication purposes. Key-management module 504 can be responsible for maintaining and managing various encryption keys. In some embodiments, key-management module 504 can maintain the public key of the endorsement key (EK) of TPM 540 and the public key of the AIK generated by TPM 540 for application module 510. Encryption module 506 can be responsible for performing various encrypting operations, which may involve asymmetric or symmetric encryption schemes. Key-request generator 508 can be responsible for generating an AIK request. Information-transmitting module 512 and information-receiving module 514 can be responsible for transmitting and receiving information, respectively. Decryption module 516 can be responsible for performing various decrypting operations. Certificate-management module 518 can be responsible for managing and maintaining various certificates, including the EK certificate issued by the manufacturer of TPM 540 and the AIK certificate issued by a PCA. Verification module 520 can be responsible for verifying whether received information, including keys and certificates, are sent by legitimate senders. Certificate-request generator 522 can be responsible for generating a request for a certificate (e.g., an AIK certificate) from the PCA.

During the operation for obtaining the AIK, random-number generator 502 generates a random number $N_1$. Key-request generator 508 generates an AIK request based on the application-identifier (denoted as L), $N_1$, and optionally the PCA identifier. More specifically, while generating the AIK request, key-request generator 508 can receive, from encryption module 506 an encryption result. More specifically, to generate the encryption result, encryption module 506 can retrieve, from key-management module 504, the public key of the endorsement key (i.e., EK), and encrypt, according to an asymmetric encryption scheme, an information collection that includes L, $N_1$, and optionally the PCA identifier. Information-transmitting module 512 can then send the AIK request to TPM module 540.

Information-receiving module 542 within TMP module 540 receives the AIK request and forwards the AIK request to decryption module 546. Decryption module 546 can retrieve, from key-management module 544, the private key of the endorsement key (denoted $EK^{-1}$), and uses $EK^{-1}$ to decrypt the received AIK request. Note that such a private key never leaves TPM module 540. The decrypt AIK request can include L, $N_1$, and optionally the PCA identifier. Key generator 550 can then generate a public/private key pair for application module 510 based on the AIK request and $EK^{-1}$. To bind the AIK to both application module 510 and TPM module 540, key generator 550 generates the AIK based on both $N_1$ and a random number $N_2$ generated by random-number generator 548. In some embodiments, encryption module 556 retrieves, from key-management module 544, $EK^{-1}$ and encrypts the concatenation of $N_1$, $N_2$, and L using $EK^{-1}$ and an asymmetric encryption scheme. The encryption result is then sent to key generator 550, which uses it as the public key of the AIK pair, denoted $AIK=[N_1\|N_2\|L]_{EK^{-1}}$, and computes the corresponding private key $AIK^{-1}$. Both AIK and $AIK^{-1}$ can then be sent to key-management module 544.

Identity-information-assembling module 552 assembles platform-identity information, which can include the public key of the AIK, the unique manufacturer-issued identifier ($T_{ID}$) to TPM 540, and optionally L and PCA. The assembled information can then be sent to encryption module 556, which retrieves, from key-management module 544, $AIK^{-1}$ and encrypts the assembled platform identity information using $AIK^{-1}$ and an asymmetric encryption scheme. The encrypted platform identity information can be denoted as: $I=[AIK, L, T_{ID}, PCA]_{AIK^{-1}}$. In addition, encryption module 556 retrieves, from certificate management module 554, the EK certificate and encrypts the EK certificate using $AIK^{-1}$ and a symmetric encryption scheme. Information-transmitting module 558 can then send the encrypted EK certificate, the public key of the AIK, and I to application module 510.

Information-receiving module 514 of application module 510 receives the information from TPM module 540, and sends the encrypted EK certificate and I to decryption module 516. Decryption module 516 can then decrypt, using $N_1$, the encrypted EK certificate to obtain Cert_EK. Decryption module 516 can retrieve, from key-management module 504, the manufacturer's public key, and decrypt Cert_EK to obtain the public key of the endorsement key, i.e., EK, and $T_{ID}$. This EK included in Cert_EK can be compared with the EK maintained by key-management module 504. A matching result can authenticate Cert_EK. Otherwise, the received Cert_EK can be discarded.

In addition, decryption module 516 can retrieve, from key-management module 504, EK, and uses EK to decrypt the received AIK to obtain $N_1$, $N_2$ and L. Decryption module 516 can also use received AIK to decrypt received I to obtain $T_{ID}$ included in I. Verification module 520 can authenticate AIK and I by comparing $N_1$ obtained from the received AIK with $N_1$ previously generated by random-number generator 502, and by comparing $T_{ID}$ obtained from decrypting I with $T_{ID}$ obtained from decrypting Cert_EK. If both comparisons provide a positive outcome, verification module 520 indicates that AIK and I have been sent by the legitimate TPM instead of a party pretending to be a trusted platform. In response, key-management module 504 keeps AIK and I. Otherwise, the received AIK and I will be discarded.

To request the AIK certificate from a PCA, a certificate-request generator 522 can generate a certificate request. The certificate request can include an encrypted portion, which can be provided by encryption module 506. More specifically, encryption module 506 can retrieve, from key-management module 504, the public key of the PCA, and encrypt the EK certificate along with L using the public key of the PCA and an asymmetric encryption scheme. The certificate request can further include AIK, I, and optionally PCA. Information-transmitting module 512 can then transmit the certificate request to the PCA. The PCA can authenticate the EK certificate and the AIK based on information included in the certificate request, generate an AIK certificate, encrypt, using EK, the AIK certificate, and sends the EK-encrypted AIK certificate to application module 510. In some embodiments, the PCA can send $[Cert\_AIK]_{EK}$ to application module 510, where $Cert\_AIK=[L, AIK, T_{ID}, PCA]_{SK(PCA)}$.

Information-receiving module 514 of application module 510 receives the EK-encrypted AIK certificate. Note that, because application module 510 does not have access to the private key of the EK pair, it can forward the EK-encrypted AIK certificate to TPM module 540.

Information-receiving module 542 of TPM module 540 receives the EK-encrypted AIK certificate and forwards it to decryption module 546. Decryption module 546 can retrieve, from key-management module 544, the private key of the EK pair, and decrypt, using $EK^{-1}$, the EK-encrypted AIK certificate to obtain the AIK certificate. Certificate-management module 554 can maintain the AIK certificate. Moreover, encryption module 556 can encrypt, using $N_1$ and a symmetric encryption scheme, the AIK certificate, and forward the $N_1$-encrypted AIK certificate to application module 510.

Information-receiving module 514 of application module 510 receives the $N_1$-encrypted AIK certificate and forwards it to decryption module 516, which can then decrypt, using $N_1$, the received message to obtain the AIK certificate.

Figure 6:
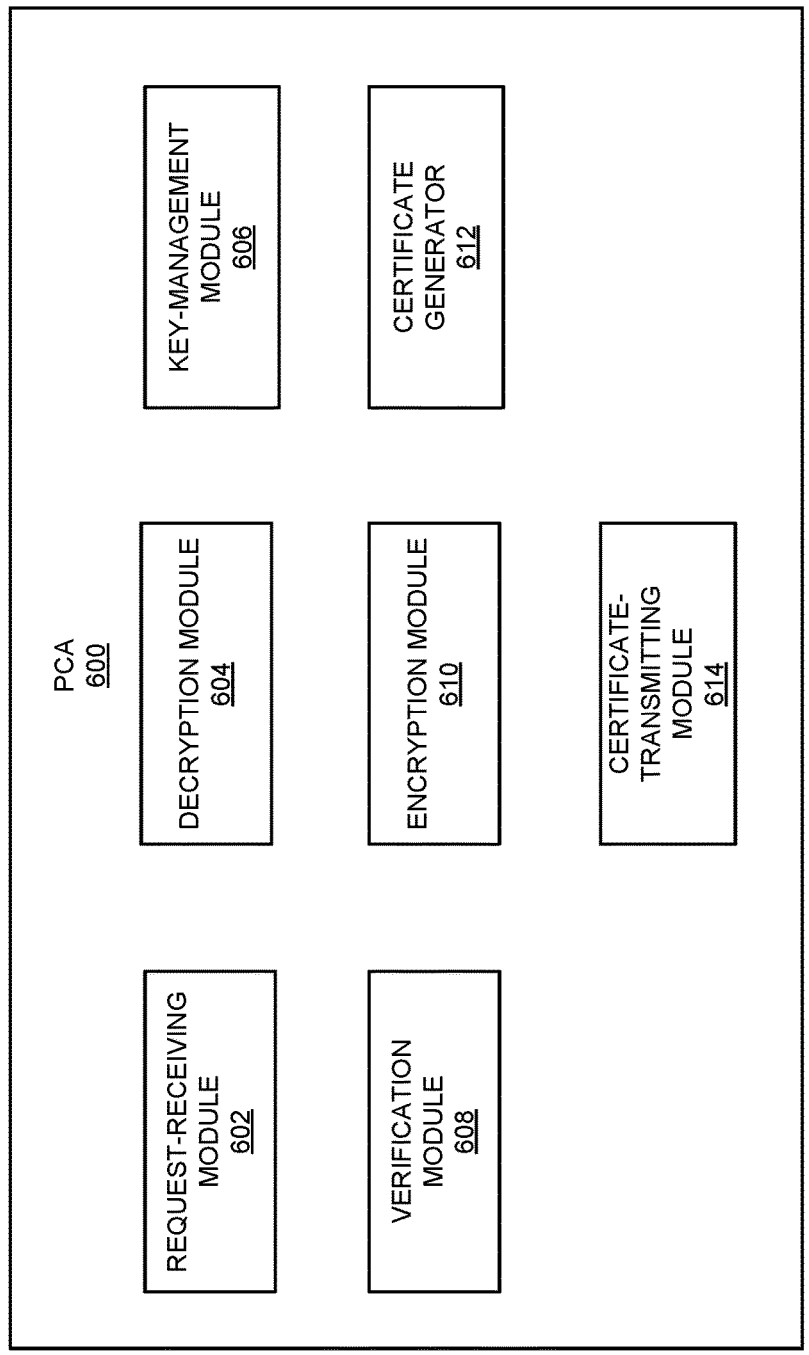
FIG. 6 illustrates a block diagram of an exemplary PCA, according to one embodiment.

FIG. 6 illustrates a block diagram of an exemplary PCA, according to one embodiment. PCA 600 can include a request-receiving module 602, a decryption module 604, a key-management module 606, a verification module 608, an encryption module 610, a certificate generator 612, and a certificate-transmitting module 614.

During operation, request-receiving module 602 receives a certificate request from a user application. In some embodiments, the certificate request can include $[Cert\_EK, L]_{PK(PCA)}$, AIK, I, and optionally PCA. Request-receiving module 602 forwards the certificate request to decryption module 604, which retrieves the private key of the PCA from key-management module 606 and decrypts $[Cert\_EK, L]_{PK(PCA)}$ to obtain Cert_EK, L. Decryption module 604 can further decrypt Cert_EK using the public key of the manufacturer to obtain $T_{ID}$, EK, and the manufacturer identifier. Verification module 608 can verify whether Cert_EK is a legitimate certificate based on the decryption result.

Once the received Cert_EK is authenticated, decryption module 604 can perform further decryption on information included in the certificate request. More specifically, decryption module 604 can use EK (which is obtained from Cert_EK) to decrypt AIK and use AIK to decrypt I. Decrypting AIK can produce L, and decrypting I can produce L and $T_{ID}$. In some embodiments, verification module 608 can compare the Ls obtained from I and AIK with the obtained L, and compare $T_{ID}$ obtained from Cert_EK with $T_{ID}$ obtained from AIK. If both comparisons produce a matching outcome, verification module 608 can generate a result indicating that the received AIK pair is indeed generated for application L by a TPM having a unique identifier $T_{ID}$. In response to verification module 608 outputting a positive verification result, certificate generator 612 can generate a certificate based on the received AIK, $T_{ID}$, L, and optionally PCA. In some embodiments, encryption module 610 encrypts a collection of information that includes the received AIK, $T_{ID}$, L, and optionally PCA using the private key of the PCA, which is maintained by key-management module 606. The encrypted collection of information is sent to certificate generator 612 as the AIK certificate for the requesting application. For example, the AIK certificate for application L can be denoted as: $Cert\_AIK=[L, AIK, T_{ID}, PCA]_{SK(PCA)}$.

Certificate generator 612 can then send the AIK certificate to encryption module 610, which encrypts, using the previously obtained EK and an asymmetric encryption scheme, the AIK certificate. Certificate-transmitting module 614 can then transmit the EK-protected AIK certificate to the requesting application.

In general, embodiments disclosed herein provide a solution to the technical problem of ensuring security in distributing the attestation identity key and corresponding certificate to an application running on a trusted platform. More specifically, the hardware or firmware module enforcing trusted computing rules (e.g., a TPM module) can generate an AIK pair for the application based on nonces generated by the application and TPM module, thus binding the AIK pair to both the application and TPM module. Moreover, the TPM module can generate TPM identity information based on the AIK and a unique identifier of the TPM. By including the TPM identity information in the certificate request to a PCA, embodiments of the present invention allow the PCA to verify that the AIK pair is indeed generated by a legitimate TPM for the requesting application. Because the PCA only issues AIK certificates to applications or processes that can provide verifiable evidence (e.g., the AIK and the TPM identity information) linking them to legitimate TPMs, an AIK certificate can enable a secure remote attestation of an application or process.

Figure 7:
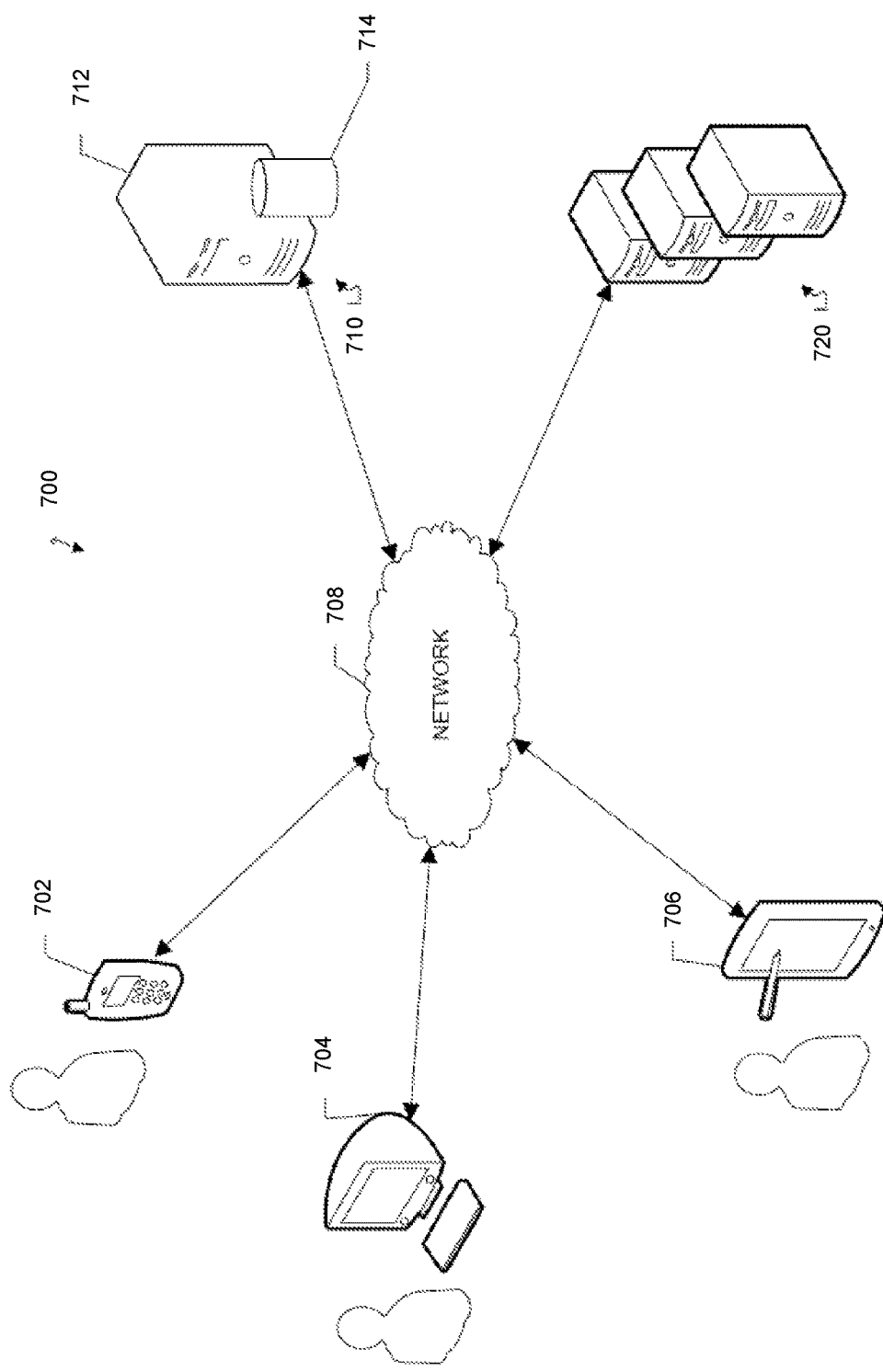
FIG. 7 illustrates an exemplary network environment for implementing the disclosed attestation technology, in accordance with some embodiments described herein.

FIG. 7 illustrates an exemplary network environment for implementing the disclosed attestation technology, in accordance with some embodiments described herein. A network environment 700 includes a number of electronic devices 702, 704 and 706 communicably connected to a server 710 by a network 708. One or more remote servers 720 are further coupled to the server 710 and/or the one or more electronic devices 702, 704 and 706.

In some exemplary embodiments, electronic devices 702, 704 and 706 can be computing devices such as laptop or desktop computers, smartphones, PDAs, portable media players, tablet computers, televisions or other displays with one or more processors coupled thereto or embedded therein, or other appropriate computing devices that can be used for displaying a web page or web application. In one example, the electronic devices 702, 704 and 706 store a user agent such as a browser or application. In the example of FIG. 7, electronic device 702 is depicted as a smartphone, electronic device 704 is depicted as a desktop computer, and electronic device 706 is depicted as a PDA.

Server 710 includes a processing device 712 and a data store 714. Processing device 712 executes computer instructions stored in data store 714, for example, to assist in scheduling a customer-initiated service or a service-provider-initiated service between a service provider and a customer at electronic devices 702, 704 and 706 during a service scheduling process.

In some exemplary aspects, server 710 can be a single computing device such as a computer server. In other embodiments, server 710 can represent more than one computing device working together to perform the actions of a server computer (e.g., cloud computing). The server 710 may host the web server communicably coupled to the browser at the client device (e.g., electronic devices 702, 704 or 706) via network 708. In one example, the server 710 may host a client application for scheduling a customer-initiated service or a service-provider-initiated service between a service provider and a customer during a service scheduling process. Server 710 may further be in communication with one or more remote servers 720 either through the network 708 or through another network or communication means.

The one or more remote servers 720 may perform various functionalities and/or storage capabilities described herein with regard to the server 710, either alone or in combination with server 710. Each of the one or more remote servers 720 may host various services. For example, servers 720 may host services providing information regarding one or more suggested locations such as web pages or websites associated with the suggested locations, services for determining the location of one or more users or establishments, search engines for identifying results for a user query, one or more user review or query services, or one or more other services providing information regarding one or more establishments, customers and/or reviews or feedback regarding the establishments.

Server 710 may further maintain or be in communication with social networking services hosted on one or more remote servers 720. The one or more social networking services may provide various services and may enable users to create a profile and associate themselves with other users at a remote social networking service. The server 710 and/or the one or more remote servers 720 may further facilitate the generation and maintenance of a social graph including the user-created associations. The social graphs may include, for example, a list of all users of the remote social networking service and their associations with other users of a remote social networking service.

Each of the one or more remote servers 720 can be a single computing device such as a computer server or can represent more than one computing device working together to perform the actions of a server computer (e.g., cloud computing). In one embodiment server 710 and one or more remote servers 720 may be implemented as a single server or a cluster of servers. In one example, server 710 and one or more remote servers 720 may communicate through the user agent at the client device (e.g., electronic devices 702, 704 or 706) via network 708.

Users may interact with the system hosted by server 710, and/or one or more services hosted by remote servers 720, through a client application installed at the electronic devices 702, 704, and 706. Alternatively, the user may interact with the system and the one or more social networking services through a web-based browser application at the electronic devices 702, 704, and 706. Communication among client devices 702, 704, 706 and the system, and/or one or more services, may be facilitated through a network (e.g., network 708).

Communication among the client devices 702, 704, 706, server 710 and/or one or more remote servers 720 may be facilitated through various communication protocols. In some aspects, client devices 702, 704, 706, server 710 and/or one or more remote servers 720 may communicate wirelessly through a communication interface (not shown), which may include digital signal processing circuitry where necessary. The communication interface may provide for communications under various modes or protocols, including Global System for Mobile communication (GSM) voice calls; Short Message Service (SMS), Enhanced Messaging Service (EMS), or Multimedia Messaging Service (MMS) messaging; Code Division Multiple Access (CDMA); Time Division Multiple Access (TDMA); Personal Digital Cellular (PDC); Wideband Code Division Multiple Access (WCDMA); CDMA2000; or General Packet Radio System (GPRS), among others. For example, the communication may occur through a radio-frequency transceiver (not shown). In addition, short-range communication may occur, including via the use of a Bluetooth-enabled device, Wi-Fi®, or another such transceiver.

Network 708 can include, for example, any one or more of a personal area network (PAN), a local area network (LAN), a campus area network (CAN), a metropolitan area network (MAN), a wide area network (WAN), a broadband network (BBN), the Internet, and the like. Further, network 708 can include, but is not limited to, any one or more of the following network topologies, including a bus network, a star network, a ring network, a mesh network, a star-bus network, a tree or hierarchical network, and the like.

FIG. 8 conceptually illustrates an electronic system with which some implementations of the subject technology are implemented. Electronic system 800 can be a client, a server, a computer, a smartphone, a PDA, a laptop, or a tablet computer with one or more processors embedded therein or coupled thereto, or any other sort of electronic device. Such an electronic system includes various types of computer-readable media and interfaces for various other types of computer-readable media. Electronic system 800 includes a bus 808, processing unit(s) 812, a system memory 804, a read-only memory (ROM) 810, a permanent storage device 802, an input device interface 814, an output device interface 806, and a network interface 816.

Bus 808 collectively represents all system, peripheral, and chipset buses that communicatively connect the numerous internal devices of electronic system 800. For instance, bus 808 communicatively connects processing unit(s) 812 with ROM 810, system memory 804, and permanent storage device 802.

From these various memory units, processing unit(s) 812 retrieves instructions to execute and data to process in order to execute the processes of the subject disclosure. The processing unit(s) can be a single processor or a multi-core processor in different implementations.

ROM 810 stores static data and instructions that are needed by processing unit(s) 812 and other modules of electronic system 800. Permanent storage device 802, on the other hand, is a read-and-write memory device. This device is a non-volatile memory unit that stores instructions and data even when electronic system 800 is off. Some implementations of the subject disclosure use a mass-storage device (such as a magnetic or optical disk and its corresponding disk drive) as permanent storage device 802.

Other implementations use a removable storage device (such as a floppy disk, flash drive, and its corresponding disk drive) as permanent storage device 802. Like permanent storage device 802, system memory 804 is a read-and-write memory device. However, unlike storage device 802, system memory 804 is a volatile read-and-write memory, such a random access memory. System memory 804 stores some of the instructions and data that the processor needs at runtime. In some implementations, the processes of the subject disclosure are stored in system memory 804, permanent storage device 802, and/or ROM 810. From these various memory units, processing unit(s) 812 retrieves instructions to execute and data to process in order to execute the processes of some implementations.

Bus 808 also connects to input and output device interfaces 814 and 806, respectively. Input device interface 814 enables the user to communicate information and select commands to the electronic system. Input devices used with input device interface 814 include, for example, alphanumeric keyboards and pointing devices (also called "cursor control devices"). Output device interface 806 enables, for example, the display of images generated by electronic system 800. Output devices used with output device interface 806 include, for example, printers and display devices, such as cathode ray tubes (CRTs) or liquid crystal displays (LCDs). Some implementations include devices such as a touchscreen that function as both input and output devices.

Finally, as shown in FIG. 8, bus 808 also couples electronic system 800 to a network (not shown) through a network interface 816. In this manner, the computer can be a part of a network of computers (such as a local area network ("LAN"), a wide area network ("WAN"), or an intranet, or a network of networks, such as the Internet. Any or all components of electronic system 800 can be used in conjunction with the subject disclosure.

These functions described above can be implemented in digital electronic circuitry; or in computer software, firmware or hardware. The techniques can be implemented using one or more computer program products. Programmable processors and computers can be included in or packaged as mobile devices. The processes and logic flows can be performed by one or more programmable processors or by one or more programmable logic circuitries. General and special purpose computing devices and storage devices can be interconnected through communication networks.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for secure attestation, the method comprising:
   receiving, by a Trusted Platform Module (TPM) of a trusted platform, an attestation-key request from an application module configured to run an application on the trusted platform, wherein the attestation-key request comprises a first nonce generated by the application module;
   computing an attestation public/private key pair by performing an encryption operation based on the first nonce, a second nonce generated by the TPM, and an application-identifier associated with the application;
   computing TPM identity information based on both a unique identifier of the TPM and the public key of the attestation public/private key pair; and
   transmitting, by the TPM, the public key of the attestation public/private key pair and the TPM identity information to the application module, thereby enabling the application module to verify the public key of the attestation public/private key pair based on the TPM identity information.

2. The computer-implemented method of claim 1, wherein the application-identifier associated with the application is included in the attestation-key request, and wherein the application-identifier and the first nonce are protected using an asymmetric encryption technique and a public key of an endorsement public/private key pair issued to the TPM by its manufacturer.

3. The computer-implemented method of claim 2, further comprising decrypting, by the TPM using a private key of the endorsement public/private key pair, the received request to obtain the application-identifier and the first nonce in plain text.

4. The computer-implemented method of claim 3, further comprising:
   in response to obtaining the first nonce in plain text, encrypting, by the TPM using the first nonce and a symmetric encryption technique, an endorsement certificate issued to the TPM by its manufacturer, wherein the endorsement certificate comprises the unique identifier of the TPM; and
   transmitting the encrypted endorsement certificate to the application.

5. The computer-implemented method of claim 4, further comprising:
decrypting, by the application module using the first nonce, the encrypted endorsement certificate;
extracting the unique identifier of the TPM included in the endorsement certificate;
comparing the unique identifier of the TPM extracted from the endorsement certificate and the unique identifier included in the TPM identity information in order to verify the public key of the attestation public/private key pair; and
in response to a successful verification of the public key of the attestation public/private key pair, keeping the public key of the attestation public/private key pair.

6. The computer-implemented method of claim 1, further comprising:
transmitting, by the application module, a certificate request to a certificate authority (CA), wherein the certificate request comprises the public key of the attestation public/private key pair and the TPM identity information.

7. The computer-implemented method of claim 6, wherein the certificate request further comprises an endorsement certificate issued to the TPM by its manufacturer, wherein the endorsement certificate comprises the unique identifier of the TPM.

8. The computer-implemented method of claim 7, further comprising:
verifying, by the CA, the certificate request based on the unique identifier of the TPM included in the endorsement certificate and the unique identifier of the TPM included in the TPM identity information.

9. The computer-implemented method of claim 1, wherein performing the encryption operation comprises encrypting, using a public key of an endorsement public/private key pair issued to the TPM by its manufacturer, a concatenation of the first nonce, the second nonce, and the application-identifier associated with the application.

10. The computer-implemented method of claim 1, wherein computing the TPM identity information comprises encrypting, using a private key of the attestation public/private key pair, a collection of information that comprises at least the public key of the attestation public/private key pair and the unique identifier of the TPM.

11. A computer system, comprising:
a processor; and
a storage device coupled to the processor and storing instructions, which when executed by the processor cause the processor to perform a method for secure attestation, the method comprising:
receiving, by a Trusted Platform Module (TPM) of a trusted platform, an attestation-key request from an application module configured to run an application on the trusted platform, wherein the attestation-key request comprises a first nonce generated by the application module;
computing an attestation public/private key pair by performing an encryption operation based on the first nonce, a second nonce generated by the TPM, and an application-identifier associated with the application;
computing TPM identity information based on both a unique identifier of the TPM and the public key of the attestation public/private key pair; and
transmitting, by the TPM, the public key of the attestation public/private key pair and the TPM identity information to the application module, thereby enabling the application module to verify the public key of the attestation public/private key pair based on the TPM identity information.

12. The computer system of claim 11, wherein the application-identifier associated with the application is included in the attestation-key request, and wherein the application-identifier and the first nonce are protected using an asymmetric encryption technique and a public key of an endorsement public/private key pair issued to the TPM by its manufacturer.

13. The computer system of claim 12, wherein the method further comprises decrypting, by the TPM using a private key of the endorsement public/private key pair, the received request to obtain the application-identifier and the first nonce in plain text.

14. The computer system of claim 13, wherein the method further comprises:
in response to obtaining the first nonce in plain text, encrypting, by the TPM using the first nonce and a symmetric encryption technique, an endorsement certificate issued to the TPM by its manufacturer, wherein the endorsement certificate comprises the unique identifier of the TPM; and
transmitting the encrypted endorsement certificate to the application.

15. The computer system of claim 14, wherein the method further comprises:
decrypting, by the application module using the first nonce, the encrypted endorsement certificate;
extracting the unique identifier of the TPM included in the endorsement certificate;
comparing the unique identifier of the TPM extracted from the endorsement certificate and the unique identifier included in the TPM identity information in order to verify the public key of the attestation public/private key pair; and
in response to a successful verification of the public key of the attestation public/private key pair, keeping the public key of the attestation public/private key pair.

16. The computer system of claim 11, wherein the method further comprises:
transmitting, by the application module, a certificate request to a certificate authority (CA), wherein the certificate request comprises the public key of the attestation public/private key pair and the TPM identity information.

17. The computer system of claim 16, wherein the certificate request further comprises an endorsement certificate issued to the TPM by its manufacturer, wherein the endorsement certificate comprises the unique identifier of the TPM.

18. The computer system of claim 17, wherein the method further comprises:
verifying, by the CA, the certificate request based on the unique identifier of the TPM included in the endorsement certificate and the unique identifier of the TPM included in the TPM identity information.

19. The computer system of claim 11, wherein performing the encryption operation comprises encrypting, using a public key of an endorsement public/private key pair issued to the TPM by its manufacturer, a concatenation of the first nonce, the second nonce, and an application-identifier associated with the application.

20. The computer system of claim 11, wherein computing the TPM identity information comprises encrypting, using a private key of the attestation public/private key pair, a collection of information that comprises at least the public key of the attestation public/private key pair and the unique identifier of the TPM.

21. A computer-implemented method for obtaining an attestation key, the method comprising:
   transmitting, by an application module running an application on a trusted platform, an attestation-key request to a Trusted Platform Module (TPM) associated with the trusted platform, wherein the attestation-key request comprises a first nonce;
   receiving, by the application module from the TPM, a public key of an attestation public/private key pair, TPM identity information, and an endorsement certificate encrypted using the first nonce, wherein the TPM identify information and the endorsement certificate each comprises a unique identifier of the TPM, and wherein the attestation public/private key pair is computed by performing an encryption operation based on the first nonce, a second nonce generated by the TPM, and an application-identifier associated with the application;
   decrypting, using the first nonce, the encrypted endorsement certificate;
   extracting the unique identifier of the TPM included in the endorsement certificate;
   comparing the unique identifier of the TPM extracted from the endorsement certificate and the unique identifier included in the TPM identity information in order to verify the public key of the attestation public/private key pair; and
   in response to a successful verification of the public key of the attestation public/private key pair, keeping the public key of the attestation public/private key pair.

22. The computer-implemented method of claim 21, wherein the application-identifier associated with the application is included in the attestation-key request, and wherein the application-identifier and the first nonce are protected using an asymmetric encryption technique and a public key of an endorsement public/private key pair issued to the TPM by its manufacturer.

23. The computer-implemented method of claim 21, wherein the TPM identity information further comprises the public key of the attestation public/private key pair, and wherein the TPM identity information is protected by a private key of the attestation public/private key pair.

* * * * *